(12) United States Patent
Mondello et al.

(10) Patent No.: US 11,893,835 B2
(45) Date of Patent: *Feb. 6, 2024

(54) IN-VEHICLE MONITORING AND REPORTING APPARATUS FOR VEHICLES

(71) Applicant: Micron Technology, Inc., Boise, ID (US)

(72) Inventors: Antonino Mondello, Messina (IT); Alberto Troia, Munich (DE)

(73) Assignee: Lodestar Licensing Group LLC, Evanston, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/503,207

(22) Filed: Oct. 15, 2021

(65) Prior Publication Data

US 2022/0036666 A1 Feb. 3, 2022

Related U.S. Application Data

(63) Continuation of application No. 15/879,954, filed on Jan. 25, 2018, now Pat. No. 11,176,760.

(51) Int. Cl.
| | |
|---|---|
| G07C 5/00 | (2006.01) |
| G06F 16/2457 | (2019.01) |
| G06N 5/04 | (2023.01) |
| G06N 20/00 | (2019.01) |
| G07C 5/08 | (2006.01) |
| H04L 12/40 | (2006.01) |
| H04L 67/12 | (2022.01) |

(52) U.S. Cl.
CPC ........ *G07C 5/008* (2013.01); *G06F 16/2457* (2019.01); *G06N 5/04* (2013.01); *G06N 20/00* (2019.01); *G07C 5/085* (2013.01); *H04L 12/40* (2013.01); *H04L 67/12* (2013.01); *H04L 2012/40215* (2013.01)

(58) Field of Classification Search
None
See application file for complete search history.

(56) References Cited

U.S. PATENT DOCUMENTS

| | | | |
|---|---|---|---|
| 7,113,853 B2 | 9/2006 | Hecklinger | |
| 9,747,730 B2 * | 8/2017 | Baer | G01C 21/3469 |
| 10,325,491 B1 | 6/2019 | Fields et al. | |
| 10,543,847 B2 * | 1/2020 | Heath | G08G 1/096775 |
| 10,825,269 B1 | 11/2020 | Brinkmann et al. | |
| 11,176,760 B2 | 11/2021 | Mondello et al. | |

(Continued)

*Primary Examiner* — Ig T An
*Assistant Examiner* — Mahmoud M Kazimi
(74) *Attorney, Agent, or Firm* — Greenberg Traurig (57) ABSTRACT

Systems and methods for monitoring and analyzing vehicle data within a vehicle and providing analytical processing data to prospective users of vehicles are disclosed. In one embodiment, a method is disclosed comprising monitoring a communications bus installed within a vehicle, the communications bus transmitting data recorded by one or more sensors installed within the vehicle; detecting a message broadcast on the communications bus; extracting an event from the message, the extraction based on a pre-defined list of event types; storing the event in a secure storage device installed within the vehicle; determining that a transfer condition has occurred; and transferring the event data to a remote server in response to determining that the transfer condition has occurred.

20 Claims, 6 Drawing Sheets

(56) References Cited

U.S. PATENT DOCUMENTS

| | | | |
|---|---|---|---|
| 2008/0238642 A1* | 10/2008 | Mauti | G08G 1/205 |
| | | | 702/36 |
| 2014/0358394 A1* | 12/2014 | Picciotti | G06F 21/552 |
| | | | 701/1 |
| 2015/0120083 A1* | 4/2015 | Gurovich | G07C 5/008 |
| | | | 701/1 |
| 2017/0351608 A1 | 12/2017 | Shirakawa | |
| 2018/0367958 A1* | 12/2018 | Dizdarevic | G08G 1/096716 |
| 2019/0039545 A1* | 2/2019 | Kumar | H04L 67/52 |
| 2019/0228596 A1 | 7/2019 | Mondello et al. | |

* cited by examiner

IN-VEHICLE MONITORING AND REPORTING APPARATUS FOR VEHICLES

RELATED APPLICATIONS

The present application is a continuation application of U.S. patent application Ser. No. 15/879,954 filed Jan. 25, 2018, the entire disclosure of which application is hereby incorporated herein by reference.

COPYRIGHT NOTICE

This application includes material that may be subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

The disclosed embodiments are directed toward vehicle data recording and, in particular, to systems and methods for monitoring and analyzing vehicle data within a vehicle and providing analytical processing data to prospective users of vehicles.

Various entities are involved in the re-selling or general provision of vehicles. Examples of these entities include car rental operations, used vehicle sellers, leasing companies, and other entities that generally provide used vehicles to potential owners or operators. In general, each of these entities provides vehicles that have been previously used by other drivers, with each other driving having their own, unique driving style.

Purchasers or lessees of used vehicles often desire detailed information regarding their purchases to ensure a vehicle will perform as expected and desired (i.e., to avoid so-called "lemon" vehicles). Current systems provide this function in a variety of ways. However, existing systems (i.e., the CARFAX system) utilize multiple third-party data sources to aggregate vehicle information. Examples of these types of user interfaces are described in, for example, U.S. Pat. No. 7,113,853 (assigned to CARFAX, INC.). These databases store information such as vehicle recalls, maintenance reports, local licensing ("DMV") reports, and other data points. These systems primarily operate by performing operations to match vehicle identification numbers (VINs) to these disparate data sources and then aggregate the returned data into a single, cohesive report.

These systems however suffer from numerous deficiencies.

First, the systems are limited to the quality of third-party data sources. If, for example, a given mechanic does not report a repair, this data is "lost" in current systems. Generally, such systems rely primarily on dealer-performed repairs and thus lose data from independent mechanics and service stations. Second, the overall architecture of these systems faces extreme complexity issues as the number of data source increase. Thus, such systems suffer "scaling" issues as the number of data points to search increases. Third, these systems do not provide any insight into driving styles (e.g., hard accelerations, hard brakes, etc.) as this data is never able to be recorded. Fourth, these systems are all susceptible to malicious changing of data by all parties involved. Fifth, these systems are only able to provide the highest level of granularity (e.g., identifying that a motor vehicle accident occurred) and cannot provide fine-grained information (e.g., that the aforementioned accident was the driver's fault or was unavoidable).

Thus, there exists a need to improve existing systems and methods of recording, analyzing, and presenting vehicle data.

SUMMARY

The disclosed embodiments solve the above-identified problems by providing a novel in-vehicle apparatus that monitors vehicle event data, optionally pre-processes this event data, segments the in-vehicle data, and provides the vehicle data to a centralized repository. The disclosed embodiments additionally describe back-end solutions to efficiently process vehicle data to generate actionable insights into the vehicle data.

Each of the disclosed embodiments describe an in-vehicle device that monitors and records vehicle data. The in-vehicle device monitors data generated by the vehicle during operation. This data includes fine-grained vehicular data such as the number of brake activations, rapid accelerations, maximum and average speeds, road conditions experienced by the vehicle, and other data points. The in-vehicle device records these data points to a secure storage device and, upon detecting a transfer condition, forwards the data to a centralized repository. In some embodiments, the in-vehicle device is equipped with an application-specific processing device that pre-processes the data on the vehicle-side to avoid tampering.

The disclosed embodiments additionally describe the use of a centralized system for performing further processing of individual vehicle data. In a first embodiment, the centralized system aggregates the vehicle data and stores the vehicle data in a database for future analysis. Additionally, the centralized system may perform post-processing on the vehicle data to generate vehicle trends and make/model trends. In some embodiments, these trends are built using one or more neural networks that model individual vehicles or vehicle types.

The centralized system additionally provides one or more of application programming interface (API) endpoints and user interfaces (UIs) to enable reporting and display of the aforementioned vehicle data.

In one embodiment, a method is disclosed comprising monitoring a communications bus installed within a vehicle, the communications bus transmitting data recorded by one or more sensors installed within the vehicle; detecting a message broadcast on the communications bus; extracting an event from the message, the extraction based on a pre-defined list of event types; storing the event in a secure storage device installed within the vehicle; determining that a transfer condition has occurred; and transferring the event data to a remote server in response to determining that the transfer condition has occurred.

In another embodiment, a method is disclosed comprising receiving an event data point from a vehicle, the event data point including a vehicle identification number (VIN) associated with the vehicle; identifying a vehicle associated with the event data point using the VIN; updating one or more aggregated vehicle metrics associated with the VIN using the event data point; training a vehicle-specific machine learning model using the event data point; and training a generic vehicle machine learning model using the event data point.

In another embodiment, an apparatus installed within a vehicle is disclosed comprising: a secure storage device; an event trigger storage device storing one or more transfer conditions; and an event pre-processor configured to: monitor a communications bus installed within a vehicle, the communications bus transmitting data recorded by one or more sensors installed within the vehicle, detect a message broadcast on the communications bus, extract an event from the message, the extraction based on a pre-defined list of event types, store the event in the secure storage device installed within the vehicle, determine that a transfer condition in the one or more transfer conditions has occurred, and transfer the event data to a remote server in response to determining that the transfer condition has occurred.

The following detailed description describes the specific technical implementations of these operations and apparatuses.

BRIEF DESCRIPTION OF THE FIGURES

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1A:
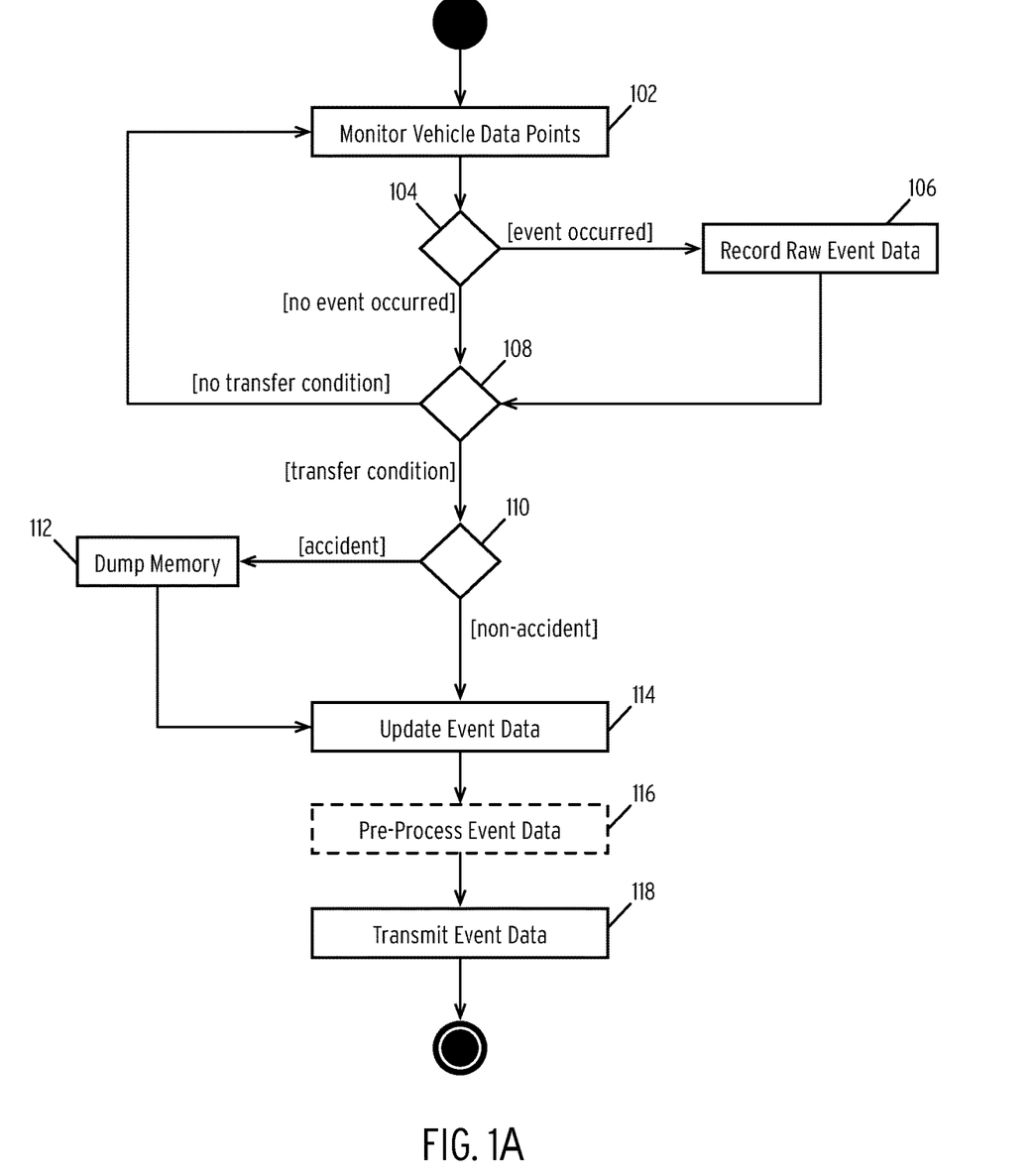
FIG. 1A is a flow diagram illustrating a method for monitoring, analyzing, and transmitting vehicle data according to some embodiments of the disclosure.

FIG. 1A is a flow diagram illustrating a method for monitoring, analyzing, and transmitting vehicle data according to some embodiments of the disclosure.

In step 102, the method monitors vehicle data points.

In the illustrated embodiment, a vehicle generates multiple data points while the vehicle is in operation and, in some case, when the vehicle is not being operated. Examples of such data points include the speed of the vehicle, whether a brake or gas pedal has been depressed, rotational angles of a steering wheel, engine alerts and status messages, fault messages from individual parts of the vehicle, mileage updates, engine starts and stops, routing information, current weather conditions, updates from non-critical vehicle components (e.g., turn signal activation, hi-beam toggle indicators, etc.), temperature settings, sensor readings, fluid levels, and various other vehicle data.

These data points may be broadcast from the generating component(s) to a central processor. Specifically, these data points may be broadcast over a shared communications bus (e.g., a controller-area network (CAN) bus, MOST bus, or other similar type of bus). For some components, data may be broadcast over multiple busses. For example, a given component may broadcast data over a first bus, e.g., a MOST bus, which in turn is connected to a larger, e.g., CAN, bus.

In one embodiment, the method monitors these data points in step 102 by "listening" on a given bus. For instance, the method may be configured to monitor a CAN bus of a vehicle to record all data broadcast on that bus. In some embodiments, the method may further be configured to monitor every bus within a vehicle in addition to the CAN bus.

Although described primarily as a passive monitoring procedure, the method may, in some embodiments, employ an active monitoring routine in conjunction with a passive monitoring routine. In this embodiment, the method may periodically issue requests to components of the vehicle to obtain a status value of a desired data point. For example, the method may issue a request for a current speed at regular intervals to maintain a continuous data stream of speed data points.

In step 104, the method determines whether a known event occurs.

As discussed in the description of step 102, the method monitors a communications bus of a vehicle. Additionally, as discussed, this bus includes all data transmitted as part of the operations of the vehicle. Thus, the data points broadcast across the bus are voluminous and may include many extraneous data points. For example, one data point may indicate that the operator of the vehicle has changed the radio station.

In step 104, the method performs a filtering operation to limit the total number of events eventually written to permanent storage. In one embodiment, the method may utilize a list of event patterns to quickly filter events on the bus. For example, the method may utilize a set of rules or patterns that define the format of data points of interest (referred to as "events"). For example, the rules may specify that any data point that includes a speed of the vehicle. As another example, the method may specify a component identifier and a status level used to filter messages (e.g., a component identifier representing the transmission and a status level of "warning", "error" or "critical" but excluding "informational").

In many instances, the data point will fail to meet the defined rules or patterns. In this case, the method may bypass further processing and continue to step 108 (discussed infra). Alternatively, if the data point matches a pattern or rule, the method performs further processing on the event in step 106.

In step 106, the method records the raw event data to a secure storage device.

In one embodiment, the method may be executed by a dedicated in-vehicle processing apparatus. This apparatus may include a processor configured to perform the steps illustrated in FIG. 1A. Additionally, the apparatus may include a secure storage device directly coupled to the processor. In one embodiment, this storage device may include a high-capacity NAND Flash-based storage device. Alternatively, the storage device may comprise a magnetic hard drive or similar storage device. The specific storage medium used is not intended to be limiting. However, in many embodiments, the storage medium may be selected be write-once read-many (WORM) optimized. For example, the storage device may include a high-density three-dimensional triple-level cell (or higher) Flash device. In some embodiments, the processor may control access to the storage device such that the storage device may be configured as "write only" by systems of the vehicle and may only be read in response to specific commands (e.g., transfer commands, discussed infra).

In the aforementioned step 106, the method writes the raw event data to the secure storage device. In one embodiment, writing the raw event data may comprise writing the event data to the tail of a log file. In one embodiment, the storage device may be formatted with log-structured storage (LSS) file system. In an LSS file system, data may only be written to the "end" of a log file stored on the device. In this manner, the storage device enforces the temporality of the event data without the need for explicit timestamping. Note, however, that timestamps may be (and often are) included within the data points identified as events.

In some embodiments, the method may further pre-process event data before writing the event data to the storage device. Examples of pre-processing event data are described in connection with step 114 and may be optionally (or alternatively) performed in step 106 if a real-time pre-processing feature is enabled.

In step 108, the method determines if a transfer condition has occurred.

As illustrated, a transfer condition refers to a set of one or more rules indicating that event data should be reported. In one embodiment, the transfer condition may comprise a periodic timer. In this embodiment, the timer may be configured by the owner of the vehicle. For example, the method may be configured to report event data on a daily or weekly basis. In some embodiments, the method may utilize a shorter or longer timer. In another embodiment, a transfer condition may comprise an interrupt triggered by a particular event. For example, the method may detect a transfer condition if an event is recorded that has a critical severity level. In another embodiment, the transfer condition may comprise a manual trigger. For example, an owner of an automobile (e.g., a vehicle rental agency) may manually trigger the transfer of event data at will (e.g., when a vehicle is returned or if a vehicle is not returned at a predetermined time). In some embodiments, the entity triggering a transfer condition may comprise an entity other than an owner (e.g., an insurance agency, law enforcement, etc.).

If the method does not detect a transfer condition, the method continues to monitor the vehicle for events and records detected events in steps 102-106.

In step 110, the method determines if the transfer condition corresponds to an accident involving the vehicle. While illustrated as a separate step, step 110 may be performed as part of step 108 and is only illustrated separately to clarify the description of the embodiments.

In the illustrated embodiment, the method monitors transfer conditions for a specific accident condition. In one embodiment, this accident condition may be trigger in response to a detection of a collision. In one embodiment, a collision is detected by monitoring the events detected for a triggering of a collision sensor. Alternatively, or in conjunction with the foregoing, the accident condition may be detected by analyzing the events to detect an airbag deployment, emergency number dialed, or other event type that indicates a potential accident has occurred. Notably, the monitoring of events improves upon existing systems that rely upon police reports and other similar data to detect accidents.

If the method detects that the transfer condition represents a vehicular accident, the method branches to a separate accident processing routine. In some embodiments, this step may be optionally enabled.

In step 112, upon detecting an accident, the method dumps the vehicle's system memory.

Although not illustrated in FIG. 1A, the method may continuously record events and data points in volatile memory for use in other system operations. In some embodiments, this memory may be utilized by, for example, an autonomous vehicle to provide autonomous services. The data stored in the vehicle's system memory is thus significantly more detailed than the event logs stored in the secure storage device in step 106. During normal operations, this detailed log of data points is not needed to provide insight into the longer-term historical record of the vehicle. However, when an accident occurs finer grained detail may be required to perform a more detailed analysis of the accident.

In one embodiment, the method in step 112 converts the contents of the system memory (e.g., RAM) into a single memory image that contains a complete replica of the system memory at the time of the accident. In some embodiments, the method may simply copy the entire memory immediately upon detecting an accident. In one embodiment, this memory image may be encrypted via the processor included within the in-vehicle device (discussed supra).

In step 112, the method then transfers the (optionally encrypted) memory image to the secure storage device. In some embodiments, this memory image may be stored on a separate partition of the secure storage device separate from the log-structured storage.

In step 114, the method updates the stored event data. In one embodiment, step 114 may only be applied to event data recorded in step 106, while the memory image generated in step 112 may not be updated.

In one embodiment, the method may update stored event data to streamline future operations. In one embodiment, the method may aggregate or combine event data into aggregated events. Examples of such aggregation techniques are described in the description of FIG. 1B. The embodiments discussed in the description of FIG. 1B relate to window-based monitoring; however other techniques may be used. For example, the method may reformat verbose event data into a standardized data format suitable for further processing. In some embodiments, pre-processing may be performed in real-time (i.e., as events are detected) or may be performed as part of a batch process at regularly scheduled intervals.

In step 116, the method optionally pre-processes the updated event data.

Figure 2:
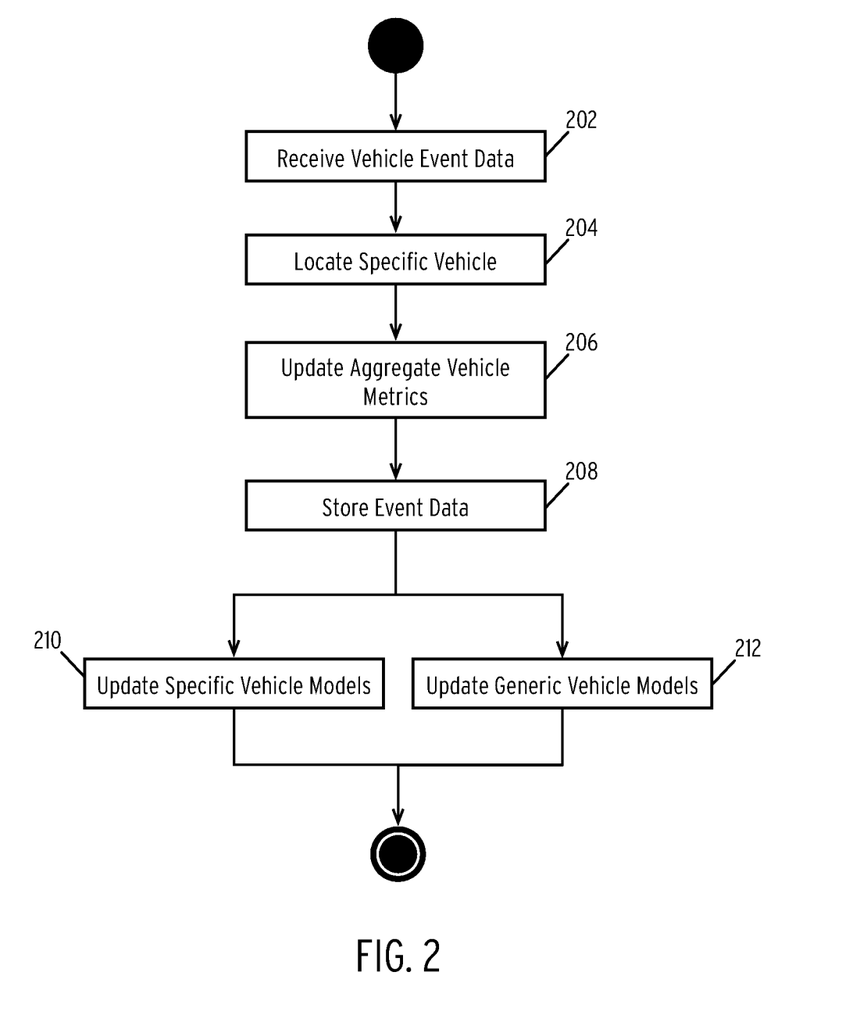
FIG. 2 is a flow diagram illustrating a method for post-processing vehicle event data according to some embodiments of the disclosure.

In one embodiment, the method may perform the functions described in the description of FIG. 2, incorporated herein by reference. Briefly, the method may perform pre-processing of data in step 116 to prevent centralized tampering of data and relieve a central processing location of excess computational requirements. For example, in one embodiment, the in-vehicle apparatus may include one or more models modeling various components of the vehicle. In step 116, the method may use relevant event data to refine the weight and other parameters of the models as part of a training phase. In this case, the method may then only transmit the updated parameters to a central server (or may transmit the parameters in addition to the data).

In step 118, the method transmits the event data to a remote location.

In some embodiments, the remote location may be operated a car rental agency, law enforcement, insurance agency, or other entity. In one embodiment, the method transmits the event data via a cellular transceiver incorporated into the in-vehicle apparatus. In other embodiments, the method may utilize an existing cellular transceiver provided by the vehicle. In some embodiments, the method may compress the data before transmitting it. Alternatively, or in conjunction with the foregoing, the method may additionally cryptographically sign and/or encrypt the data before transmittal.

Figure 1B:
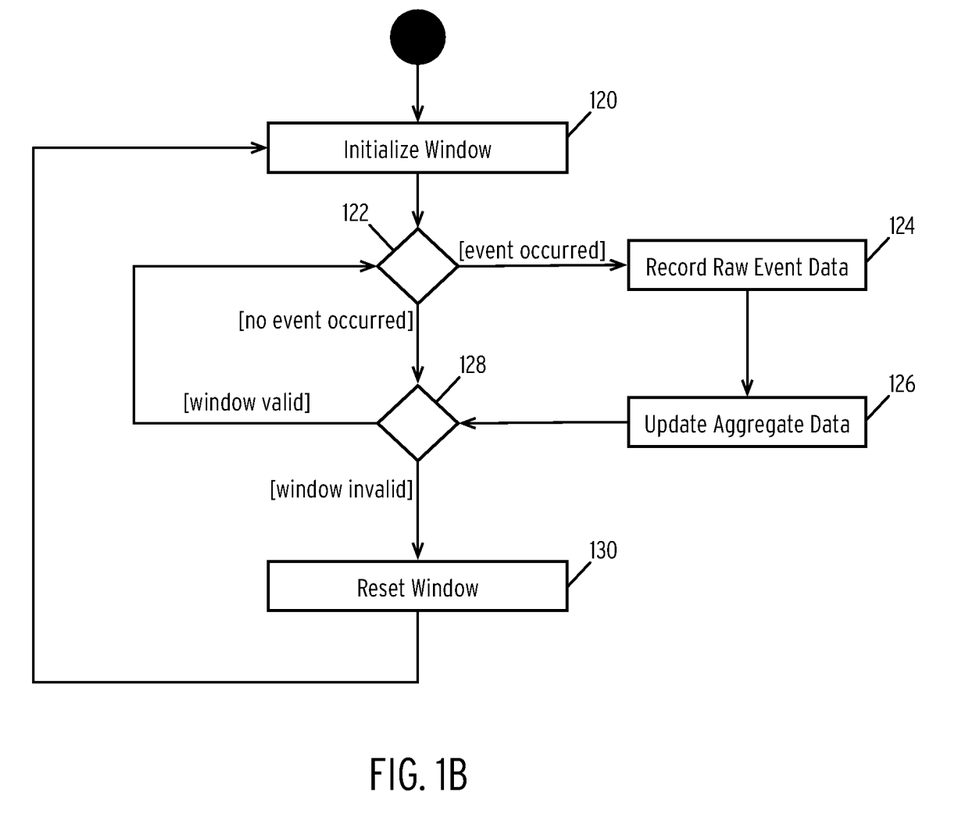
FIG. 1B is a flow diagram illustrating a method for analyzing vehicle event data using a sliding time window according to some embodiments of the disclosure.

FIG. 1B is a flow diagram illustrating a method for analyzing vehicle event data using a sliding time window according to some embodiments of the disclosure.

In step 120, the method initializes a time window.

In one embodiment, a time window refers to a predefined period to utilize in monitoring for event data. In some embodiments, the time window may be set as a pre-defined time interval (e.g., one hour). In other embodiments, the time window may be dynamically determined based on a recorded sensor value. For example, the method may monitor speed changes and initialize a time window when an acceleration exceeds a defined threshold. In this embodiment, the method may set a window invalidation condition (discussed in step 128) that correspondingly refers to a defined deceleration threshold.

As another example, the time window may be set to begin when a brake signal is detected and may continue until a brake has been released. As another example, the method may start a time window when a vehicle is started and may execute steps 122-128 until the vehicle is turned off.

In step 122, the method determines if an event has occurred. In one embodiment, step 122 may be similar to step 122, the disclosure of which is incorporated herein by reference in its entirety. In the illustrated embodiment, however, the method may further filter events based on the time window under inspection. For example, if a time window corresponds to a brake window, the method in step 122 may only identify brake-related events as relevant for further processing.

In steps 124 and 126, the method records raw event data and updates aggregated data, respectively. These steps are described more fully in the description of steps 106 and 114-116, the details of which are incorporated herein by reference in its entirety.

Notably however, the method requires the execution of step 126 in the illustrated embodiment. This step may be required due to the use of a windowing technique to monitor data. Specifically, the method in FIG. 1B is designed to monitor slightly higher-level detail versus raw event data. For example, the method may be configured to record pre-defined time intervals to determine if a speed has reached a maximum speed (i.e., higher than a posted speed limit). In this embodiment, the method aggregates data to generate a single event for a set of potentially voluminous event data points. Thus, in this example, for a given interval (e.g., 1 hour), the method may generate a single event data point representing the monitored condition (e.g., a vehicle has exceeded the speed limit "5" times for a total time of "35 minutes" during a 1-hour interval).

In step 128, the method determines if the window is still valid.

If the window is still valid (e.g., a window invalidation condition has not been triggered), the method continues to process events in steps 122-126. As described brief above, a window invalidation condition may comprise a set of condition that cause the method to invalidate a time window for monitoring vehicle data points. In embodiment, the window invalidation condition may comprise the expiration of pre-defined time interval. Alternatively, the window invalidation condition may comprise a sensor reading meeting a pre-defined threshold. For example, in the braking scenario, the window invalidation condition may comprise an indication that a brake signal has been removed (i.e., the vehicle is no longer braking).

In step 130, the method resets the time window if the window has expired.

In one embodiment, resetting a window may comprise the same steps as executed in step 120, the description of which is incorporated herein by reference in its entirety.

FIG. 2 is a flow diagram illustrating a method for post-processing vehicle event data according to some embodiments of the disclosure.

In step 202, the method receives vehicle event data. In the illustrated embodiment, the vehicle event data comprises the event data generated in FIGS. 1A and 1B, the disclosure of each incorporated by reference in its entirety. In one embodiment, each item of event data is associated with a VIN or similar identifying string.

In step 204, the method identifies a specific vehicle associated with the event data.

As discussed above, an item of event data may be assigned with a VIN or similar identifier that uniquely identifies the vehicle that generated the event data. In some embodiments, the event data (including the VIN) may be cryptographically signed to prevent "spoofing" or tampering of VINs included within event data.

The method extracts the VIN from the event data and locates a vehicle in a database of vehicles. In some embodiments, the database of vehicles may be provided by a third party. In other embodiments, the database may be maintained by a single entity (e.g., a car rental provider or law enforcement). In any event, the method matches the received event data to a known vehicle. In some embodiments, the method may discard event data that cannot be matched to a known vehicle.

In step 206, the method updates aggregate vehicle metrics.

In some embodiments, the method maintains a list of synthesized metrics. In one embodiment, these synthesized metrics represent data not occurring verbatim in the event data. For example, a number of hard brakes, acceleration rates, average weather conditions, average maximum speed, and other data points are synthesized from a historical record of sensor events. As a specific example, the method may receive speed data points recorded in a given window and may calculate the maximum speed for the window. The method may then retrieve a set of previous maximum speeds for other windows and calculate the average maximum speed for all windows.

Examples of additional aggregate metrics are described below:

Acceleration Rates: generated based on individual event data points representing instant acceleration at a given moment. In one embodiment, the method calculates average acceleration rates using a window starting when a vehicle is started and ending when a vehicle is stopped.

Braking Rates: generated based on individual events representing sensor measurements indicating that a brake pedal was depressed (or a brake signal was otherwise transmitted). Windows for such events may be defined as starting when a brake signal is received and ending when the brake signal is removed. Window data points may be classified based on the braking intensity (e.g., "hard" brakes, soft brakes). The number of hard and soft brakes (as an example) may be aggregated to form an overall model of braking styles for the vehicle/driver.

Maximum Speed: generated based on speed event data points recorded in a pre-defined interval. This interval may start when a vehicle is started and end when a vehicle is turned off. The maximum speed may represent the number of times a vehicle has met a preset maximum speed threshold. This threshold may be static or may be based on the speed limit of roadways traveled on during the window. For a given window, the method may aggregate the number of times a vehicle has exceeded a maximum speed during the life of a vehicle (or during a rental period).

Road Conditions: generated based on weather reports associated with a date or time included within the event data as well as coordinates (e.g., GPS coordinates) of the vehicle at the time the event is received. In some embodiments, road conditions may be synthesized from non-weather event data points (e.g., based on any timestamped event data point). That is, if, for example, a brake event includes a timestamp and a location, a road condition event may be synthesized from the data point. In one embodiment the method aggregates road condition data over the lifespan of the vehicle (or during a rental period) to obtain a view into what weather conditions the vehicle has operated in.

Mileage: generated based on mileage measurements and event data points generated during any given time window. In one embodiment, the method aggregates mileage data by storing each recorded point and calculating the average increase in mileage as a function of time.

Component Status: generated based on sensor readings (informational, critical, warnings, etc.) generated by components of the vehicle during pre-defined windows. In one embodiment, the method aggregates these events by discarding unnecessary events and calculating the number of critical or warning events during a predefined window (e.g., one month or one year).

In step 208, the method stores the event data.

In addition to the aggregated or synthesized events, the method also stores the raw event data in the event that further processing is needed. In one embodiment, the method may store raw event data in a large-scale data warehouse or other semi-structured data storage system. In some embodiments, the processing in step 206 (and in steps 210 and 212) may be performed on this semi-structured data using a big data processing framework such as HADOOP®.

In steps 210 and 212, the method updates specific and generic vehicle models, respectively.

In each step, the models are generated using the raw event data and, in some embodiments, the synthesized/aggregated event data. In one embodiment, the models may comprise neural networks, support vector machines, or other predictive machine learning models.

In general, the data stored in steps 206 and 208 represents a time series of events. In this manner, predictive models may be trained using a known event of interest (e.g., an engine fault) and a series of preceding events (e.g., a high temperature warning, a pattern of rapid accelerations, etc.). The number of models is not intended to be limiting and, indeed, can be sized based on the number of predictions desired to make.

In one embodiment, the method feeds all event data occurring before an event desired to be predicted into the machine learning model as training data. In some embodiments, the method may trim the amount of event data to reduce training complexity. For example, the method may only utilize one month of previous event data as training data. In some embodiments, the amount of training data may be sized based on event types.

The preceding discussion describes modeling generally for each type of model, however, in the illustrated embodiment, the method generates two separate models. A first model is generated for the specific vehicle (e.g., identified by a VIN) while another model is generated for a "generic" vehicle. As used herein a "generic" vehicle refers to a class of vehicles the VIN-identified vehicle belongs to (e.g., all vehicles with the same make, model, and, as applicable, component configurations).

In general, the primary difference between the two models is the selection of training data. Indeed, the same model may be used to predict the same feature for each type of vehicle. In general, the generic vehicle models utilize event data from multiple vehicles. In this manner, the generic vehicle models may provide finely refined models given the significant increase in training data.

In some embodiments, the selection of generic vehicle models may be made based on observations of the specific models. As a simplistic example, one may identify that electrical malfunctions of vehicles are not heavily dependent on specific vehicle behavior (with one caveat discussed infra). In this case, the method may forego training a specific vehicle model and only train a generic model to predict future electrical malfunctions. Notably, however, regional factors may affect electrical malfunctions. Specifically, regional weather patterns may increase or decrease the likelihood of electrical issues. In this case, the method may weight event data associated with harsher weather conditions. Specifically, while selecting event data for input, the method may issue a query using the VINs of the event data to refine the event data based on a returned location or average weather condition. In some embodiments, the method may attempt to balance vehicles having opposite weather conditions (e.g., evening the number of vehicles subject to extreme cold versus extreme heat).

As will be described in connection with FIG. 3, the aggregated data, raw data, and specific/generic models are used to provide actionable intelligence to potential users of the vehicle.

Figure 3:
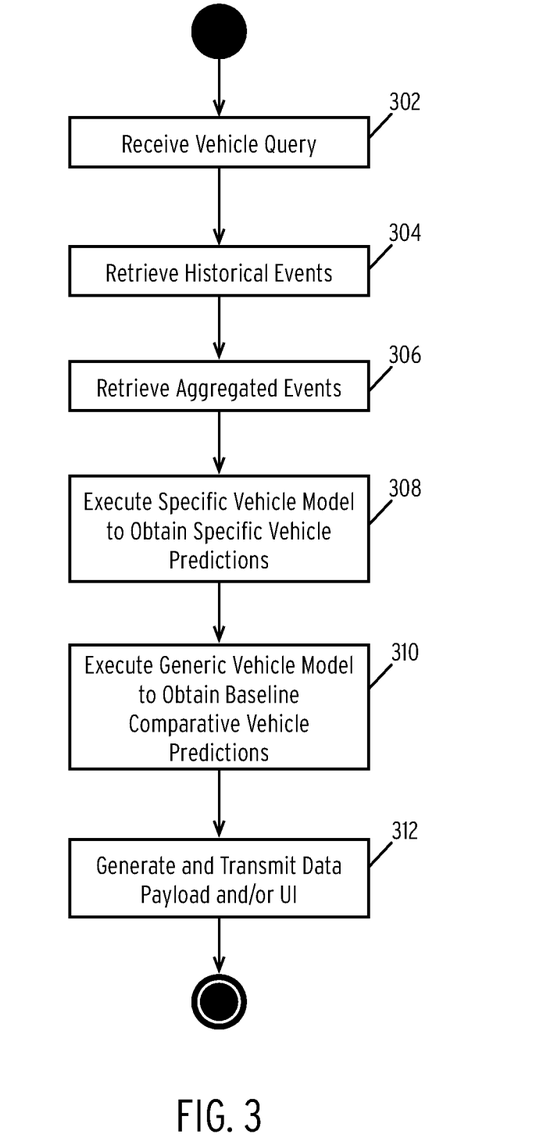
FIG. 3 is a flow diagram illustrating a method for responding to vehicle search queries and providing actionable data to users based on known and predicted vehicle characteristics according to some embodiments of the disclosure.

FIG. 3 is a flow diagram illustrating a method for responding to vehicle search queries and providing actionable data to users based on known and predicted vehicle characteristics according to some embodiments of the disclosure.

In step 302, the method receives a vehicle query. A vehicle query may be received via multiple modalities discussed herein.

In a first scenario, the method executed in FIG. 3 may be performed by a vehicle reseller. In this scenario, a potential purchaser of a vehicle may specify a set of constraints desired in locating a potential vehicle. These constraints are transmitted to a search engine operated by the reseller which in turn identifies a set of candidate vehicles. Each candidate vehicle is associated with a VIN and these VINs are used to issue the vehicle queries in step 302. Thus, the illustrated method may be executed for each matching vehicles.

In a second scenario, the method executed in FIG. 3 may be performed by a vehicle rental agency. In some embodiments, a potential renter may issue a query, and the server may respond, in a manner similar to the first scenario. Alternatively, the rental agency may provide a list of vehicles for rent to the potential renter. A user may select one or more vehicles which would trigger a search for the VINs associated with these vehicles in a similar manner as discussed in the first scenario.

In a third scenario, a query may be issued by law enforcement. In this scenario, law enforcement may issue a query directly for a VIN number. In other embodiments, the query may comprise a locational or temporal window to search for recorded events. Each event matching the location and/or time may be queried to extract VINs associated with the events. These VINs may then be used to identify specific vehicles, similar to the first scenario.

In each scenario, the query may be issued via a mobile application (e.g., via an API) or via a web-based application (e.g., via an HTTP request).

In steps 304 and 306, the method retrieves historical events and aggregated events, respectively. These events correspond to the events stored in step 208 (for historical events) and generated in step 206 (for aggregated events). The description of these events presented in connection with FIG. 2 is incorporated herein by reference in its entirety.

In step 308 and 310, the method executes the specific and generic vehicle models, respectively.

In one embodiment, the method utilizes the historical event data as input into both models. In one embodiment, the models generate predictions for future events such as component failures and other predicted events discussed more fully in connection with FIG. 2. In the illustrated embodiment, the input into the generic vehicle model may comprise the vehicle-specific data to generate a predicted data value based on the model built using all similar vehicles.

In step 312, the method generates and transmits a data payload or, in some embodiments, a user interface using the data retrieved or generated in steps 304-310.

In one embodiment, the payload comprises a structured data packet containing all of the aforementioned data. An example of such a structure is as follows.

```
{
  VIN: 1234567,
  aggregated metrics: {
    hard_brakes: { total: 100, per_100_ miles: 15 },
    component_failures: {
      electrical: { headlight: 1, audio: 2 }
      ...
    },
    maximum_speed_met: { total: 25, per_100_miles: 2}
    ...
  },
  predictions: {
    component_failures: {
      engine: { "30 days", type: 'specific' }
      braking: { "2 months", type: 'specific' }
      electrical: { "3 months", type: 'generic' }
      ...
    }
  }
  raw_data: [
    {type: 'engine', event: 'low coolant', timestamp:
       1516733196 }
    ...
  ]
}
```

In some embodiments, the payload may omit the raw data unless requested to minimize the amount of data transferred.

Alternatively, or in conjunction with the foregoing, the method may also transmit a user interface graphically displaying the information stored within the payload. For example, the method may transmit a web page or other remote user interface. In some embodiments, the user interface (e.g., for a mobile application) may be constructed using the payload.

Figure 4:
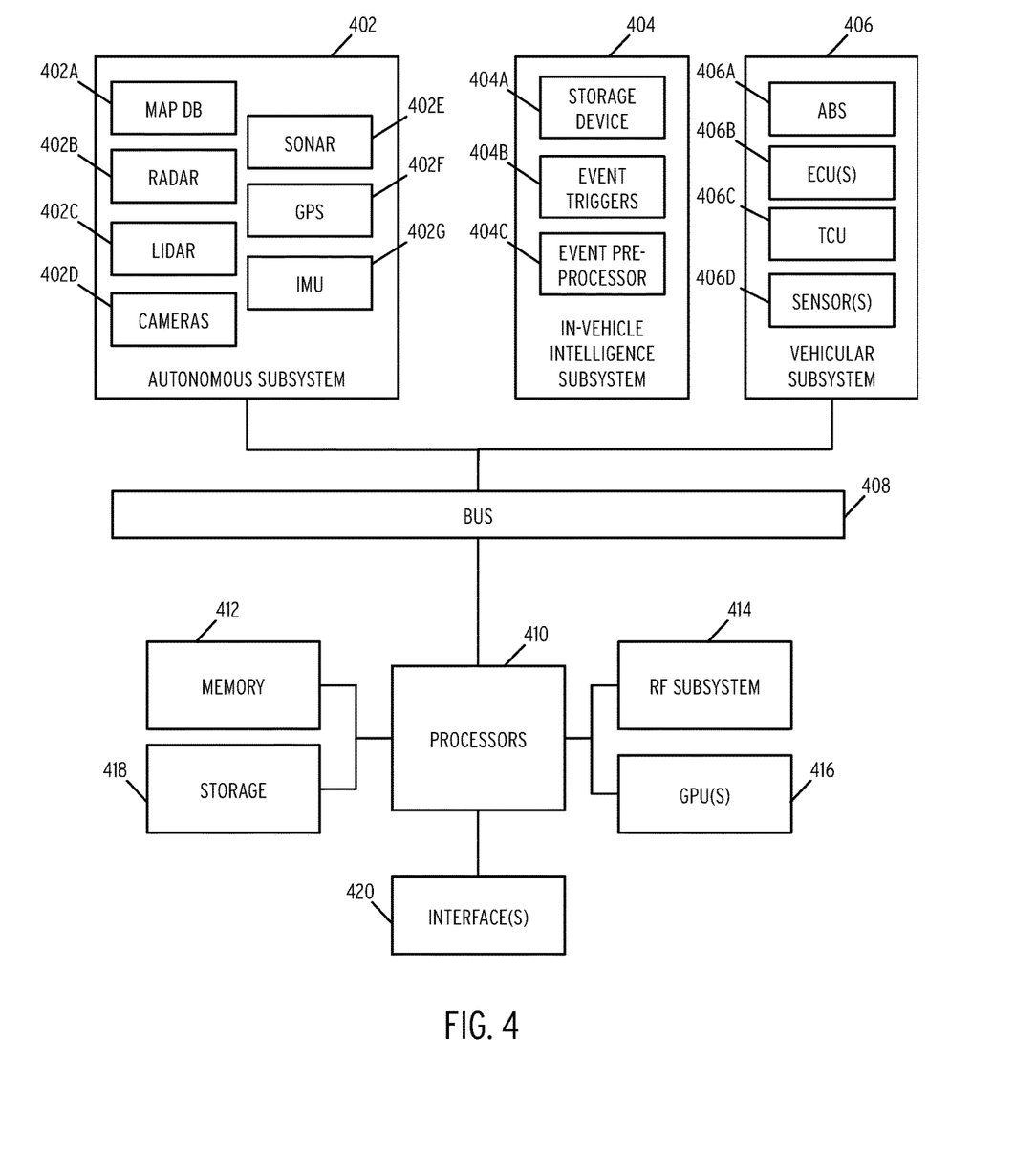
FIG. 4 is a block diagram of a vehicle according to some embodiments of the disclosure.

FIG. 4 is a block diagram of a vehicle according to some embodiments of the disclosure.

The system illustrated in FIG. 4 may be installed entirely within a vehicle. In some embodiments, some components (e.g., components and subsystems other than subsystem (404)) may comprise existing autonomous vehicle subsystems.

The system includes an autonomous vehicle subsystem (402). In the illustrated embodiment, autonomous vehicle subsystem (402) includes map database (402A), radar devices (402B), Lidar devices (402C), digital cameras (402D), sonar devices (402E), GPS receivers (402F), and inertial measurement units (402G). Each of the components of autonomous vehicle subsystem (402) comprises standard components provided in most current autonomous vehicles. In one embodiment, map database (402A) stores a plurality of high-definition three-dimensional maps used for routing and navigation. Radar devices (402B), Lidar devices (402C), digital cameras (402D), sonar devices (402E), GPS receivers (402F), and inertial measurement units (402G) may comprise various respective devices installed at various positions throughout the autonomous vehicle as known in the art. For example, these devices may be installed along the perimeter of a vehicle to provide location awareness, collision avoidance, and other standard autonomous vehicle functionality.

Vehicular subsystem (406) is additionally included within the system. Vehicular subsystem (406) includes various anti-lock braking systems (406A), engine control units (402B), and transmission control units (402C). These components may be utilized to control the operation of the autonomous vehicle in response to the streaming data generated by autonomous vehicle subsystem (402A). The standard autonomous vehicle interactions between autonomous vehicle subsystem (402) and vehicular subsystem (406) are generally known in the art and are not described in detail herein. Vehicular subsystem (406) additionally includes one or more sensors (406D) such as airbag sensors, impact sensors, and other sensors known in the art.

Note that in some embodiments, the autonomous vehicle subsystem (402) may be optional. In this embodiment, the in-vehicle intelligence subsystem (404) may only process data points generated by vehicular subsystem (406) and other sensors installed on a non-autonomous vehicle.

The processing side of the system includes one or more processors (410), short-term memory (412), an RF system (414), graphics processing units (GPUs) (416), long-term storage (418) and one or more interfaces (420).

The one or more processors (410) may comprise central processing units, FPGAs, or any range of processing devices needed to support the operations of the autonomous vehicle. Memory (412) comprises DRAM or other suitable volatile RAM for temporary storage of data required by processors (410). RF system (414) may comprise a cellular transceiver and/or satellite transceiver. Long-term storage (418) may comprise one or more high-capacity solid-state drives (SSDs). In general, long-term storage (418) may be utilized to store, for example, high-definition maps, routing data, and any other data requiring permanent or semi-permanent storage. GPUs (416) may comprise one or more high throughput GPU devices for processing data received from autonomous vehicle subsystem (402). Finally, interfaces (420) may comprise various display units positioned within the autonomous vehicle (e.g., an in-dash screen).

The system additionally includes an in-vehicle subsystem (404) which performs all of the data collection and processing required by the methods illustrated in the preceding Figures. The in-vehicle subsystem (404) includes a secure storage device (404A) which is connected to bus (408) and stores event data and, if implemented, a memory dump. Details of secure storage device (404A) are described more fully in the preceding description and these details are not repeated herein but are incorporated herein by reference in their entirety.

The in-vehicle subsystem (404) additionally includes event triggers (404B). In one embodiment, event triggers (404B) comprise one or more conditions that trigger the transmission of event data to a remote server as discussed previously. In some embodiments, these may be stored in an EEPROM or similar storage device.

The in-vehicle subsystem (404) additionally includes an event pre-processor (404C). In one embodiment, the event pre-processor (404C) is configured to coordinate access to the storage device (404A) as well as determine when an event trigger has occurred. Event pre-processor (404C) additionally is configured to coordinate the transfer of event data from the vehicle to a remote server. Note that in some embodiments, the event pre-processor (404C) may perform all steps described in connection with FIGS. 1A and 1B.

Each of the devices is connected via a bus (408). In one embodiment, the bus (408) may comprise a controller area network (CAN) bus. In some embodiments, other bus types may be used (e.g., a FlexRay or MOST bus). Additionally, each subsystem may include one or more additional busses to handle internal subsystem communications (e.g., LIN busses for lower bandwidth communications).

Figure 5:
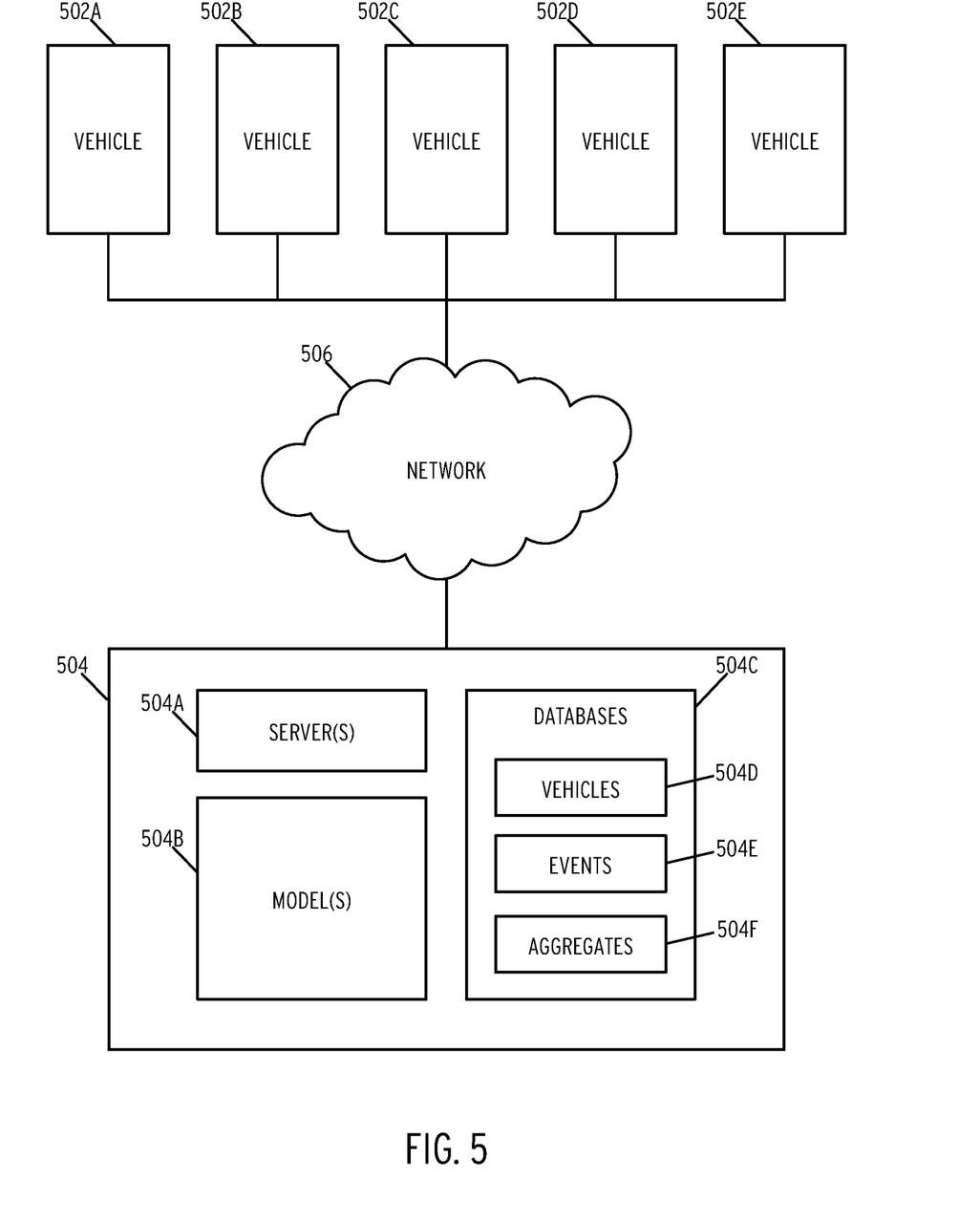
FIG. 5 is a block diagram of a centralized vehicle operations system according to some embodiments of the disclosure.

FIG. 5 is a block diagram of a centralized autonomous vehicle operations system according to some embodiments of the disclosure.

As illustrated, the system includes a number of vehicles (502A-502E). In one embodiment, each vehicle may comprise a vehicle such as that depicted in FIG. 4, the disclosure of which is incorporated herein by reference in its entirety. Each vehicle (502A-502E) may communication with a central system (504) via a network (506). In one embodiment, network (506) comprises a global network such as the Internet. In some embodiments, the vehicles may comprise autonomous vehicles.

Central system (504) includes a plurality of servers (504A). In one embodiment, servers (504A) comprise a plurality of front end webserver configured to serve responses to vehicles (502A-502E). The servers (504A) may additionally one or more application server configured to perform the operations discussed in the previous flow diagrams.

Central system (504) additionally includes a plurality of models (504B). In one embodiment, the models (504B) correspond to the specific and generic models described previously. Central system (504) additionally includes one or more databases (504C). The databases (504C) may include database record for vehicles (504D), events (504E), and aggregates (504F). As described previously, vehicles stored in database (504D) comprise a listing of known vehicles with VINs. Events (504E) comprise a big data storage device for storing raw event data. Aggregates (504F) may comprise a storage device for aggregated events synthesized from raw events. Each database (504D-504F) has been described previously and that discussion is incorporated herein by reference in its entirety.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A device comprising:
   a write-only storage device;
   a volatile memory; and
   a processor configured to:
      extract an event from a message,
      store the event in the write-only storage device,
      store the message in the volatile memory,
      transfer the event from the write-only storage device to a remote server in response to a transfer condition occurring, and
      transfer contents of the volatile memory to the remote server in response to the transfer condition occurring.

2. The device of claim 1, wherein extracting the event from the message further comprises filtering the message using a set of rules defining a format of accepted messages.

3. The device of claim 2, wherein the format comprises an identification of a severity level of the message.

4. The device of claim 1, the processor further configured to encrypt the event before storing the event in the write-only storage device.

5. The device of claim 1, the processor further configured to pre-process the event by aggregating one or more previous events with the event prior to transferring the event.

6. The device of claim 1, the processor further configured to:
   detect a collision;
   transfer the contents of a system memory to the write-only storage device in response to detecting the collision; and
   include the contents of the system memory in the event.

7. A method comprising:
   extracting an event from a message;
   storing the event in a write-only storage device;
   storing the message in a volatile memory;
   transferring the event from the write-only storage device to a remote server in response to a transfer condition occurring; and
   transferring contents of the volatile memory to the remote server in response to the transfer condition occurring.

8. The method of claim 7, wherein extracting the event from the message further comprises filtering the message using a set of rules defining a format of accepted messages.

9. The method of claim 8, wherein the format comprises an identification of a severity level of the message.

10. The method of claim 7, further comprising encrypting the event before storing the event in the write-only storage device.

11. The method of claim 7, further comprising pre-processing the event by aggregating one or more previous events with the event prior to transferring the event.

12. The method of claim 7, further comprising:
   detecting a collision;
   transferring the contents of a system memory to the write-only storage device in response to detecting the collision; and
   including the contents of the system memory in the event.

13. The method of claim 7, further comprising:
   monitoring a communications bus, the communications bus connecting one or more sensors and transmitting data recorded by the one or more sensors; and
   detecting the message broadcast on the communications bus.

14. A non-transitory computer-readable storage medium for tangibly storing computer program instructions capable of being executed by a computer processor, the computer program instructions defining steps of:
- extracting an event from a message;
- storing the event in a write-only storage device;
- storing the message in a volatile memory;
- transferring the event from the write-only storage device to a remote server in response to a transfer condition occurring; and
- transferring contents of the volatile memory to the remote server in response to the transfer condition occurring.

15. The non-transitory computer-readable storage medium of claim 14, wherein extracting the event from the message further comprises filtering the message using a set of rules defining a format of accepted messages.

16. The non-transitory computer-readable storage medium of claim 15, wherein the format comprises an identification of a severity level of the message.

17. The non-transitory computer-readable storage medium of claim 15, the steps further comprising encrypting the event before storing the event in the write-only storage device.

18. The non-transitory computer-readable storage medium of claim 15, the steps further comprising pre-processing the event by aggregating one or more previous events with the event prior to transferring the event.

19. The non-transitory computer-readable storage medium of claim 15, the steps further comprising:
- detecting a collision;
- transferring the contents of a system memory to the write-only storage device in response to detecting the collision; and
- including the contents of the system memory in the event.

20. The non-transitory computer-readable storage medium of claim 15, the steps further comprising:
- monitoring a communications bus, the communications bus connecting one or more sensors and transmitting data recorded by the one or more sensors; and
- detecting the message broadcast on the communications bus.

* * * * *